United States Patent
Yao et al.

(10) Patent No.: US 10,429,692 B2
(45) Date of Patent: Oct. 1, 2019

(54) LIQUID CRYSTAL DISPLAY PANEL AND FABRICATION METHOD

(71) Applicants: Xiamen Tianma Micro-electronics Co., Ltd., Xiamen (CN); Tianma Micro-electronics Co., Ltd., Shenzhen (CN)

(72) Inventors: Shulin Yao, Xiamen (CN); Long Zhang, Xiamen (CN); Ting Zhou, Xiamen (CN); Poping Shen, Xiamen (CN); Zhaokeng Cao, Shanghai (CN)

(73) Assignees: Xiamen Tianma Micro-electronics Co., Ltd., Xiamen (CN); Tianma Micro-electronics Co., Ltd., Shenzhen (CN)

( * ) Notice: Subject to any disclaimer, the term of this patent is extended or adjusted under 35 U.S.C. 154(b) by 652 days.

(21) Appl. No.: 14/989,845

(22) Filed: Jan. 7, 2016

(65) Prior Publication Data

US 2016/0238886 A1 Aug. 18, 2016

(30) Foreign Application Priority Data

Feb. 13, 2015 (CN) .......................... 2015 1 0076504

(51) Int. Cl.
*G02F 1/1335* (2006.01)
*G02F 1/03* (2006.01)
*G02F 1/01* (2006.01)

(52) U.S. Cl.
CPC .. *G02F 1/133528* (2013.01); *G02F 1/133514* (2013.01); *G02F 2001/13356* (2013.01);
(Continued)

(58) Field of Classification Search
None
See application file for complete search history.

(56) References Cited

U.S. PATENT DOCUMENTS

| 2006/0023143 | A1* | 2/2006 | Lee ..................... G02B 27/26 349/102 |
| 2007/0284346 | A1* | 12/2007 | Choo ................ G02F 1/133528 219/121.69 |
| 2013/0050628 | A1* | 2/2013 | Takano ............... G02F 1/13338 349/143 |

FOREIGN PATENT DOCUMENTS

| CN | 1339715 A | 3/2002 |
| CN | 1716055 A | 1/2006 |
| CN | 103852896 A | 6/2014 |

\* cited by examiner

*Primary Examiner* — Edward J Glick
*Assistant Examiner* — Anthony G Quash
(74) *Attorney, Agent, or Firm* — Anova Law Group, PLLC (57) ABSTRACT

The present disclosure provides a liquid crystal display panel. The liquid crystal display panel includes an upper substrate, a lower substrate, a liquid crystal layer sandwiched between the upper and lower substrates, an upper regionalized polarizer disposed on the upper substrate including a plurality of first upper polarizing units and second upper polarizing units, and a lower regionalized polarizer disposed on the lower substrate including a plurality of first lower polarizing units and second lower polarizing units. The first lower polarizing units correspond to the first upper polarizing units. The second lower polarizing units correspond to the second upper polarizing units. The first upper polarizing units and the second upper polarizing units have mutually orthogonal polarization directions. The first lower polarizing units and the first upper polarizing units have mutually orthogonal polarization directions. The second lower polarizing units and the second upper polarizing units have mutually orthogonal polarization directions.

10 Claims, 6 Drawing Sheets

(52) U.S. Cl.
CPC ............ *G02F 2001/133531* (2013.01); *G02F 2001/133538* (2013.01); *G02F 2001/133565* (2013.01); *G02F 2201/52* (2013.01)

LIQUID CRYSTAL DISPLAY PANEL AND FABRICATION METHOD

CROSS-REFERENCES TO RELATED APPLICATIONS

This application claims the priority of Chinese Patent Application No. CN201510076504.6, filed on Feb. 13, 2015, the entire contents of which are incorporated herein by reference.

FIELD OF THE DISCLOSURE

The present disclosure generally relates to the field of display technologies and, more particularly, relates to a liquid crystal display panel and a fabrication method thereof.

BACKGROUND

Thin film transistor liquid crystal displays (TFT-LCD) have become the mainstream flat penal displays and have gradually replaced the traditional cathode ray tube (CRT) displays. The TFT-LCDs have been widely used in television sets, desktop computer monitors, notebook computers, GPS devices, game consoles, palm computers, digital cameras, and mobile phones, etc. The TFT-LCDs have many application liquid crystal display modes, such as the most popular twisted nametic (TN) display mode, vertical alignment (VA) display mode, the fast growing in-plane switch (IPS) display mode, and fringe field switching (FFS) display mode, etc.

All these display modes share one common feature of applying electric voltage to control the alignment direction of the liquid crystal molecules to modulate the external light passing through the liquid crystal material. Thus, the image display function is achieved. Because of the wide viewing angles and other advantages, the IPS and FFS display modes are more popular and widely used. The IPS and FFS display modes will be used as examples in the following descriptions.

However, the IPS and FFS display modes often require using polarizers, and the variations in the polarization directions of the polarizers may affect display quality. The disclosed liquid crystal display panel and fabrication method are directed to solve one or more problems in the art.

BRIEF SUMMARY OF THE DISCLOSURE

Directed to solve one or more problems set forth above and other problems in the art, the present disclosure provides a liquid crystal display panel and a fabrication method to improve image viewing experience.

One aspect of the present disclosure includes a liquid crystal display panel. The liquid crystal display panel includes an upper substrate, a lower substrate, a liquid crystal layer sandwiched between the upper and lower substrates, an upper regionalized polarizer disposed on the upper substrate including a plurality of first upper polarizing units and second upper polarizing units, and a lower regionalized polarizer disposed on the lower substrate including a plurality of first lower polarizing units and second lower polarizing units. The first lower polarizing units correspond to the first upper polarizing units. The second lower polarizing units correspond to the second upper polarizing units. The first upper polarizing units and the second upper polarizing units have mutually orthogonal polarization directions. The first lower polarizing units and the first upper polarizing units have mutually orthogonal polarization directions. The second lower polarizing units and the second upper polarizing units have mutually orthogonal polarization directions.

Another aspect of the present disclosure provides a method of fabricating the liquid crystal display panel. The method includes providing a lower substrate; spin-coating an organic film forming material on the lower substrate; and providing a first linearly polarized light by passing an ultra violet light through a polarizer to irradiate the organic film forming material through a first mask to form a plurality of first polarizing units. The method also includes horizontally rotating the polarizer by 90 degrees or horizontally rotating the lower substrate coated with the organic film forming material by 90 degrees to obtain a second linearly polarized light to irradiate the organic film forming material through a second mask to form a plurality of second polarizing units. The plurality of second lower polarizing units and the plurality of first lower polarizing units have mutually orthogonal polarization directions. Further, the method includes curing the organic film forming material to form a lower regionalized polarizer on the lower substrate.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
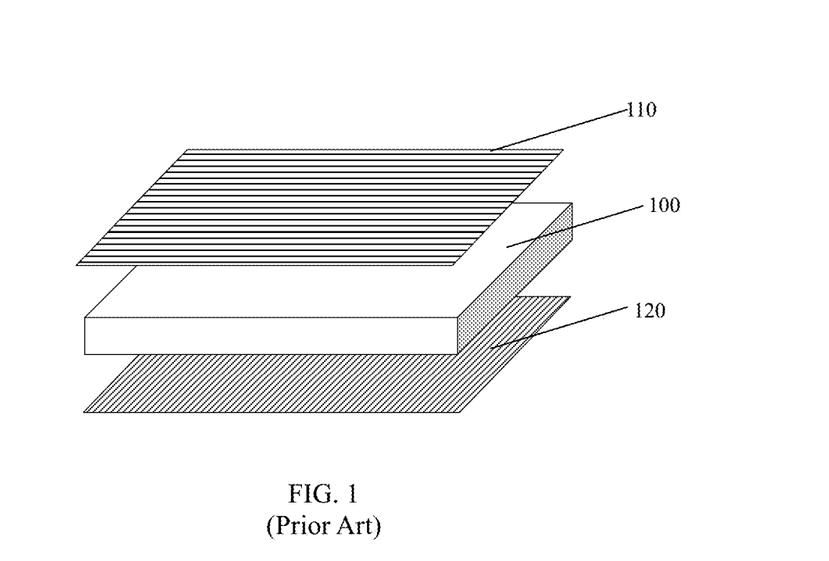
FIG. 1 illustrates a schematic view of a liquid crystal display panel.

A TFT-LCD display module may include a liquid crystal display panel, a backlight source, and an external drive circuit, etc. FIG. 1 illustrates a schematic view of an exemplary liquid crystal display panel. Referring to FIG. 1, the liquid crystal display panel may include a liquid crystal cell 100 with a liquid crystal layer sandwiched between two glass substrates, a lower polarizer 110 configured under the liquid crystal cell 100, and an upper polarizer 120 configured above the liquid crystal cell 100.

Figure 2:
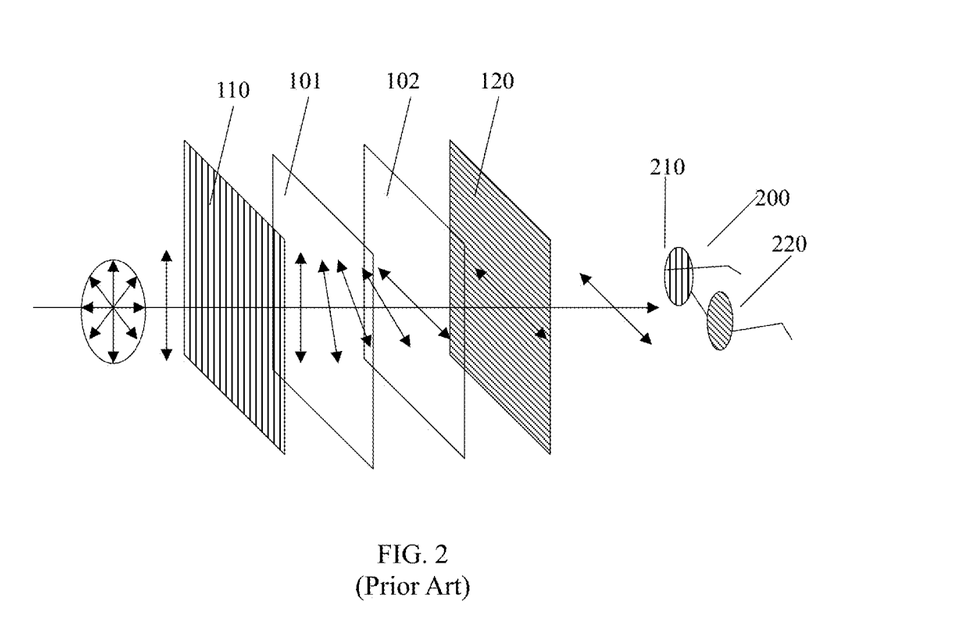
FIG. 2 illustrates a schematic view of polarization direction changes when a light passes through the liquid crystal display panel shown in FIG. 1.

FIG. 2 illustrates a schematic view of polarization direction changes when a light passes through the liquid crystal display panel shown in FIG. 1. Referring to FIG. 2, a thin film transistor array may be configured on the lower glass substrate 101 to actively drive the liquid crystal cell 100. A color filter may be configured on the upper glass substrate 102 for color display. The lower polarizer 110 and the upper polarizer 120 may be attached on the lower glass substrate 101 and the upper glass substrate 102, respectively. The lower polarizer 110 and the upper polarizer 120 may have only one transmission axis for passing light of one polarization direction.

Specifically, the two glass substrates 101 and 102 may be configured respectively with an alignment layer (not shown) on the sides facing toward the liquid crystal layer. The alignment layers on the two glass substrates 101 and 102 may have the rubbing directions in parallel with each other. The polarization direction of either the lower polarizer 110 or the upper polarizer 120 may be the same as the rubbing direction of the alignment layer on the corresponding glass substrate. The polarization direction of the other polarizer may be orthogonal to the rubbing direction of the alignment layer on the corresponding glass substrate.

When a voltage applied to the liquid crystal molecules is smaller than the liquid crystal threshold voltage, the liquid crystal molecules at the interfaces of the two glass substrates 101 and 102 in the liquid crystal cell 100 may be aligned in the rubbing directions of the alignment layers on the two glass substrates 101 and 102 such that the light from the backlight source may be blocked by the combination of the lower polarizer 110 and the upper polarizer 120 that have orthogonal polarization directions. Accordingly, the liquid crystal display panel may be in a dark state.

When a voltage applied to the liquid crystal molecules is greater than the liquid crystal threshold voltage, the liquid crystal molecules at the interfaces of the two glass substrates 101 and 102 in the liquid crystal cell 100 may be rotated by the electric field such that the light from the backlight source may have the polarization direction changed by the rotated liquid crystal molecules and may pass through the upper polarizer 120. Accordingly, the liquid crystal display panel may be in a bright state.

However, because the lower polarizer 110 and the upper polarizer 120 have a uniform polarization direction on the entire surface, the image displaying light emitted from the entire surface of the liquid crystal display panel may have a uniform polarization direction. In other words, only linearly polarized light may be obtained. An observer may wear a viewing device configured with polarizers, such as a sun glass 200 with two lenses 210 and 220 as shown in FIG. 2. The two lenses 210 and 220 may include two polarizers that have mutually orthogonal polarization directions. When the emitted light of one polarization direction passes through the two polarizers 210 and 220, the polarization direction of the emitted light may be limited by the two polarizers 210 and 220. The emitted light may have a polarization direction forming an angle with the polarization directions of both polarizers 210 and 220. Thus, the display effect may be affected.

Figure 3:
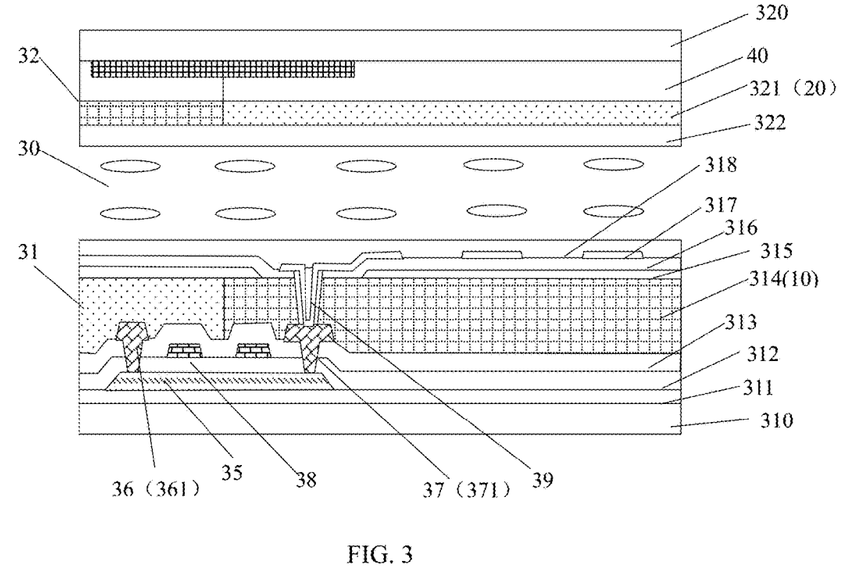
FIG. 3 illustrates a schematic view of an exemplary liquid crystal display panel according to the disclosed embodiments.

FIG. 3 illustrates a schematic view of the structure of an exemplary liquid crystal display panel according to the present disclosure. Referring to FIG. 3, the liquid crystal display panel may include a lower substrate 31, an upper substrate 32, and a liquid crystal layer 30 sandwiched between the lower substrate 31 and the upper substrate 32. In one embodiment, a thin film transistor array may be formed on the lower substrate 31 to actively drive the liquid crystal molecules. Such lower substrate 31 may be called an array substrate. A color filter may be formed on the upper substrate 32 to display colors. Such upper substrate may be called a color filter substrate.

Specifically, the lower substrate 31 may include a transparent base substrate 310. A buffer layer 311, an active layer 35, a gate insulating layer 312, a gate electrode 38, a gate line (not shown), a first insulating layer 313, a source electrode 36, a drain electrode 37, and a data line (not shown) may be formed sequentially on the transparent substrate 310. The gate electrode 38 and the gate line may be coplanar with each other. The source electrode 36, the drain electrode 37 and the data line may be coplanar with each other and may be formed on the first insulating layer 313.

The data line may be electrically connected to the source electrode 36. The source electrode 36, the drain electrode 37, the data line, and the first insulating layer 313 may be covered by a lower planarization layer 314. The lower planarization layer 314 may provide polarizing function. In other words, a lower regionalized polarizer 10 may be formed in the lower planarization layer 314.

A first electrode 315 and a second electrode 317 may be formed on the planarization layer 314. The first electrode 315 and the second electrode 317 may be separated by a second insulating layer 316. The second insulating layer 316 may be formed to cover the first electrode 315 and the planarization layer 314. A lower alignment layer 318 may be formed to cover the second electrode 317 and the second insulating layer 316. The lower alignment layer 318 may contact the liquid crystal layer 30 to provide an initial alignment direction to the liquid crystal molecules on the side of the liquid crystal layer 30 facing toward the lower substrate 31.

The lower planarization layer 314 may be made of one or more of acrylic resin, naphthoquinone diazide ester, 1,4-dioxane, coupling agent, diethylene glycol ethyl methyl ether, and propylene glycol methyl ether acetate, etc. The fluidity of these materials may make it desirable to fill the gaps and steps caused by the thickness differences when the data lines and the gate insulating layer 312, etc. are formed.

The lower planarization layer 314 may be formed with a flat surface. When the first electrode 315 is formed on the lower planarization layer 314, the surface flatness may be ensured. Subsequently, a uniform distance between the first electrodes 315 and the second electrodes 317 may be obtained to increase the distribution uniformity of the electric field between the first electrode 315 and the second electrode 317. At the same time, the lower planarization layer 314 may be used to reduce the coupling capacitance between the first electrode 315 and metal lines such as the data line to improve the display effect of the liquid crystal display panel. Further, the lower planarization layer 314 may be doped with a dichroic organic dye. When the dye coating process is completed, lower regionalized polarizers 10 with different polarization directions may be formed through optical alignment.

Further, the first electrode 315 may be a common electrode, and the second electrode 317 may be a pixel electrode. Through a through-hole 39 penetrating the second insulating layer 316, the first electrode 315, and the lower planarization layer 314, the second electrode 317 may be electrically connected to the drain electrode 37. The first electrode 315 and the second electrode 317 may be used to provide a liquid crystal display panel with a horizontal electric field parallel to the direction of the surface of the lower substrate 31. The horizontal electric field may be used to drive the liquid crystal molecules in the liquid crystal layer 30 to rotate to alter the polarization direction of the incidental light.

The upper substrate 32 may include a transparent base substrate 320. A color filter 40, an upper planarization layer 321, and an upper alignment layer 322 may be formed sequentially on the transparent base substrate 320. For example, a color filter 40 may be formed on the side of the transparent base substrate 320 facing toward the lower substrate, an upper planarization layer 321 may be formed on the color filter 40, and an upper alignment layer 322 may be formed on the upper planarization layer 321. The upper alignment layer 322 may contact the liquid crystal layer 30 to provide an initial alignment direction to the liquid crystal molecules on the side of the liquid crystal layer 30 facing toward the upper substrate 32. The upper alignment layer 322 may have a rubbing direction same as the rubbing direction of the lower alignment layer 318. In one embodiment, the upper planarization layer 321 may provide polarizing function. In other words, an upper regionalized polarizer 20 may be formed in the upper planarization layer 321.

In one embodiment, the lower regionalized polarizer 10 may be coplanar with the lower planarization layer 314, and the upper regionalized polarizer 20 may be coplanar with the upper planarization layer 321. No additional films may be needed to form the polarizers. In the meantime, no polarizers may be pasted or attached on the lower substrate 31 and the upper substrate 32. Thus, the overall thickness of the liquid crystal display panel may be reduced to provide a light weight, thin and low cost display product.

Figure 4:
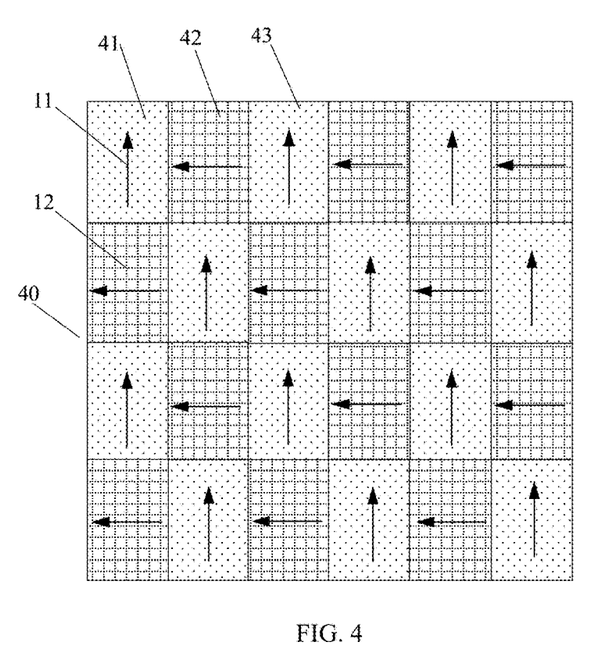
FIG. 4 illustrates a schematic view of an exemplary lower regionalized polarizer according to the disclosed embodiments.

FIG. 4 illustrates a schematic view of an exemplary lower regionalized polarizer according to the present disclosure. Referring to FIG. 4, the specific configuration of the polarization directions of the lower regionalized polarizer 10 is provided. The lower regionalized polarizer 10 may include a plurality of first lower polarizing units 11 and second lower polarizing units 12. The first lower polarizing units 11 and the second lower polarizing units 12 may have mutually orthogonal polarization directions.

Figure 5:
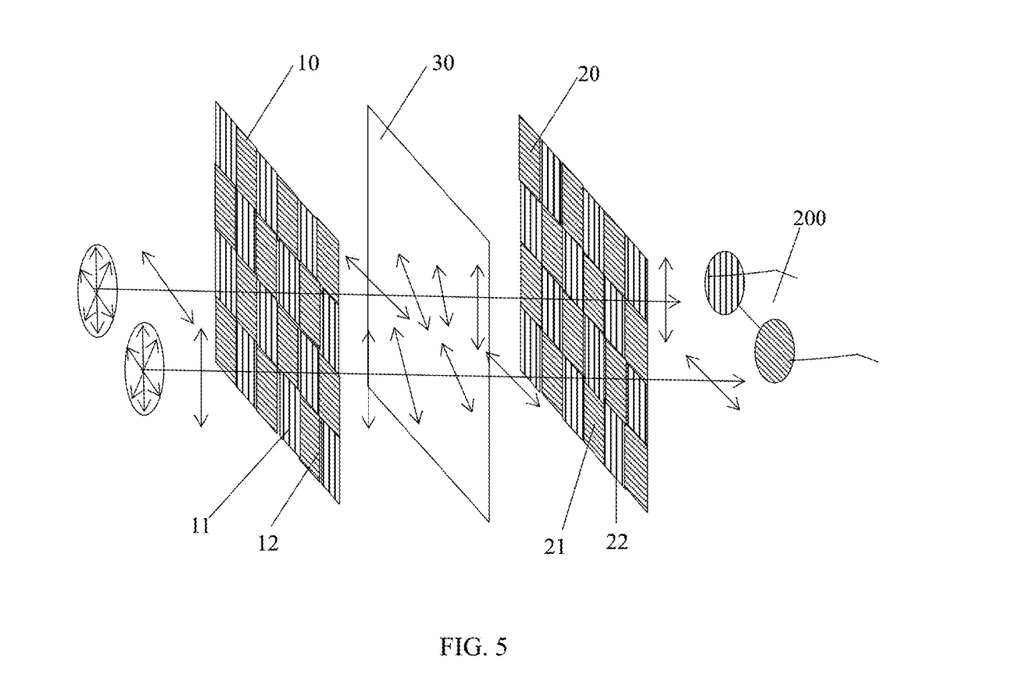
FIG. 5 illustrates a schematic view of polarization direction changes when a light passes through the liquid crystal display panel shown in FIG. 3.

Accordingly, FIG. 5 illustrates a schematic view of polarization direction changes when light passes through the liquid crystal display panel shown in FIG. 3. Referring to FIG. 5, the upper regionalized polarizer 20 may include a plurality of first upper polarizing units 21 and second upper polarizing units 22. The first upper polarizing units 21 may correspond to the first lower polarizing units 11. The second upper polarizing units 22 may correspond to the second lower polarizing units 12. The first upper polarizing units 21 and the first lower polarizing units 11 may have mutually orthogonal polarization directions. The second upper polarizing units 22 and the second lower polarizing units 12 may have mutually orthogonal polarization directions.

In one embodiment, the lower alignment layer 318 may, but is not limited to, have an alignment direction mutually parallel with the polarization direction of the first lower polarizing units 11 and mutually orthogonal to the polarization direction of the second lower polarizing units 12. Alternatively, the lower alignment layer 318 may have an alignment direction mutually orthogonal to the polarization direction of the first lower polarizing units 11 and mutually parallel with the polarization direction of the second lower polarizing units 12.

Referring back to FIG. 4, the color filter 40 disposed on the upper substrate 32 may include a plurality of color barriers, corresponding to a plurality of sub-pixel units on the lower substrate 31. In one embodiment, the color filter 40 may include a plurality of first color barriers 41, second color barriers 42, and third color barriers 43 for displaying various colors. The first color barriers 41, the second color barriers 42, and the third color barriers 43 may be arranged alternately and repeatedly in rows on the color filter 40. Color barriers displaying same color may be arranged in columns on the color filter 40. For example, first color barriers 41 may be arranged in one column, and second color barriers 42 may be arranged in adjacent column.

In one embodiment, the first lower polarizing units 11 and the second lower polarizing units 12 of the lower regionalized polarizer 10 may correspond to a different color barrier respectively. The first lower polarizing units 11 and the second lower polarizing units 12 may be arranged alternately and repeatedly in rows on the color filter 40.

For example, a first lower polarizing unit 11 may be arranged corresponding to a first color barrier 41, a second lower polarizing unit 12 may be arranged corresponding to a second color barrier 42, and a first lower polarizing unit 11 may be arranged corresponding to a third color barrier 43, etc. Such arrangement may be repeated in such order when being arranged in a row. The first lower polarizing units 11 and the second lower polarizing units 12 may be arranged alternately and repeatedly in a column on the color filter 40. In other words, two first lower polarizing unit 11 or two second lower polarizing unit 12 may not be adjacent to each other in rows or in columns on the color filter 40.

Figure 6:
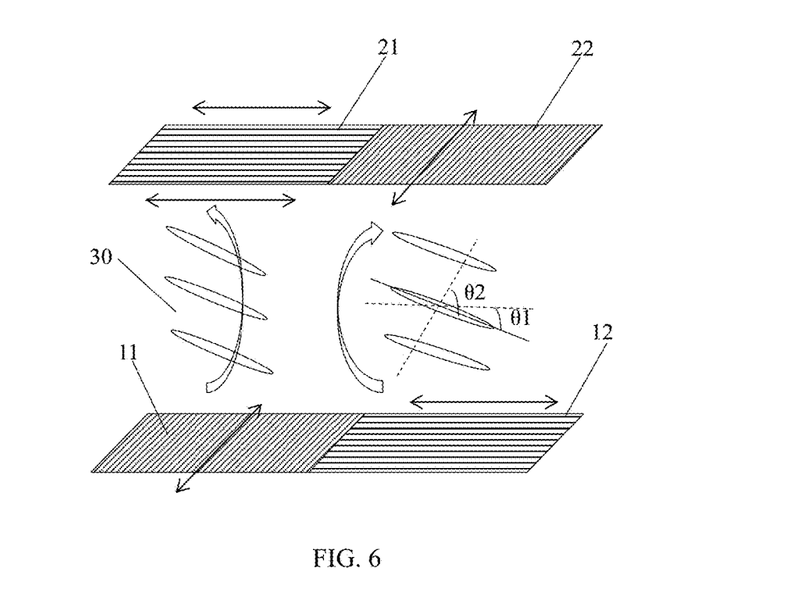
FIG. 6 illustrates a schematic view of the relationship between the liquid crystal molecules and the polarization directions in an exemplary liquid crystal display panel according to the disclosed embodiments.

FIG. 6 illustrates a schematic view of the relationship between the liquid crystal molecules and the polarization directions in an exemplary liquid crystal display panel according to the present disclosure. Referring to FIG. 6, the polarization direction change may be further illustrated when light passes the liquid crystal display panel according to the present disclosure. In addition to the upper regionalized polarizer 20, the lower regionalized polarizer 10, and the liquid crystal layer 30 shown in FIG. 5, the rotation of the liquid crystal molecules disposed between the two polarizing units of the upper regionalized polarizer 20 and the lower regionalized polarizer 10 may be illustrated in FIG. 6.

Specifically, when the voltage applied to the liquid crystal molecules in the liquid crystal layer 30 is smaller than the liquid crystal threshold voltage, the liquid crystal molecules at the interfaces of the lower substrate 31 and the upper substrate 32 may be aligned under the electric field driven by the first electrode 315 and the second electrode 317 in the alignment directions of the lower alignment layer 318 and the upper alignment layer 322 respectively. In other words, the liquid crystal molecules may be aligned in the polarization directions of the first lower polarizing unit 11 on the lower regionalized polarizer 10 and the second upper polarizing unit 22 on the upper regionalized polarizer 20, respectively. Thus, the light emitted from the backlight source (not shown) on the side of the lower substrate 31 facing away from the upper substrate 32 may be blocked substantially at the first lower polarizing units 11 and the second upper polarizing units 22 by the lower regionalized polarizer 10 and the upper regionalized polarizer 20 with mutually orthogonal polarization directions. Accordingly, the liquid crystal display panel may be in the dark state.

When the voltage applied to the liquid crystal molecules in the liquid crystal layer 30 is greater than the liquid crystal threshold voltage, the liquid crystal molecules in the liquid crystal layer 30 may rotate in planes parallel with the surface of the lower substrate 31 and the upper substrate 32. The liquid crystal molecules may be aligned in an alignment direction forming an acute angle (not equal to 0 degree or 90 degrees) with the polarization directions of the lower regionalized polarizer 10 and the upper regionalized polarizer 20. For example, the liquid crystal molecules disposed between the second lower polarizing unit 12 and the second upper polarizing unit 22 as shown in FIG. 6 may rotate to an alignment direction forming an angle θ1 with the polarization direction of the second lower polarizing unit 12 and an angle θ2 with the polarization direction of the second upper polarizing unit 22, wherein, $0°<θ1≤45°$, and $0°<θ2≤45°$.

An incident light may pass the second lower polarizing units 12 to become a linearly polarized light with a polarization direction same as the polarization direction of the second lower polarizing units 12. When passing through the liquid crystal molecules, the linearly polarized light may rotate the polarization direction to pass through the second upper polarizing units 22 to become the emitted light for displaying images. The light emitted from the second upper polarizing units 22 may be a linearly polarized light with a polarization direction parallel with the polarization direction of the second upper polarizing units 22.

Similarly, the light emitted from the first upper polarizing units 21 may be a linearly polarized light with a polarization direction parallel with the polarization direction of the first upper polarizing units 21. Because the first upper polarizing units 21 and the second upper polarizing units 22 have mutually orthogonal polarization directions, the light emitted from the liquid crystal display panel may be guaranteed to have two mutually orthogonal polarization directions. So the light emitted from the liquid crystal display panel may be similar to natural light. Thus, the viewer wearing polarized glasses 200 may observe a desirable display effect.

The liquid crystal display panel according to the present disclosure may have different numbers and different distribution patterns of the lower regionalized polarizers 10 and the upper regionalized polarizers 20.

Figure 7:
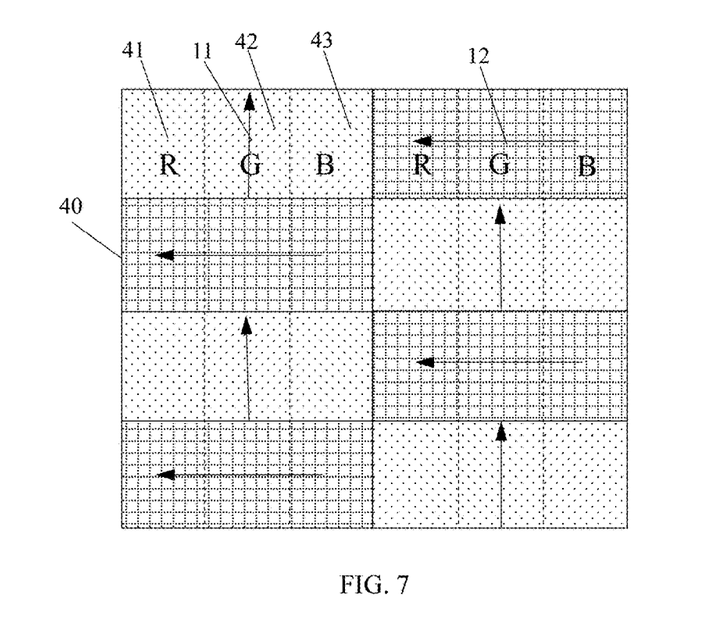
FIG. 7 illustrates a schematic view of another exemplary lower regionalized polarizer according to the disclosed embodiments.

FIG. 7 illustrates a schematic view of another exemplary lower regionalized polarizer according to the present disclosure. Referring to FIG. 7, a similar liquid crystal display panel may be provided. The color filter 40 disposed on the upper substrate 32 may include a plurality of color barriers corresponding to a plurality of sub-pixel units disposed on the lower substrate 31. The color filter 40 may include first color barriers 41, second color barriers 42, and third color barriers 43 for displaying different colors. The first color barriers 41, the second color barriers 42, and the third color barriers 43 may be arranged alternately and repeatedly in rows on the color filter 40. Color barriers displaying same color may be arranged in columns on the color filter 40. For example, first color barriers 41 may be arranged in one column, and second color barriers 42 may be arranged in adjacent column. A first color barrier 41, a second color barrier 42, and a third color barrier 43 may form a color barrier unit.

The lower regionalized polarizer 10 shown in FIG. 7 may be different from other embodiments above because the lower regionalized polarizer 10 has each first lower polarizing unit 11 corresponding to three adjacent color barriers and each second lower polarizing unit 12 corresponding to three adjacent color barriers. For example, a color barrier unit including a first color barrier 41, a second color barrier 42, and a third color barrier 43 may be arranged in a row on the color filter 40 in each first lower polarizing unit 11. Similarly, two first lower polarizing units 11 or two second lower polarizing units 12 may not be arranged adjacently in rows or columns on the color filter 40.

In one embodiment, the first color barrier 41, the second color barrier 42, and the third color barrier 43 may be a red (R) color barrier, a green (G) color barrier, and a blue (B) color barrier respectively.

In one embodiment, each polarizing unit may correspond to a color barrier, and the first lower polarizing units 11 and the second lower polarizing units 12 may have same number of corresponding color barriers. In another embodiment, each polarizing unit may correspond to three color barriers, and the first lower polarizing units 11 and the second lower polarizing units 12 may have same number of corresponding color barriers.

In another embodiment, the first lower polarizing units 11 and the second lower polarizing units 12 may have different numbers of corresponding color barriers as long as the first upper polarizing units 21 and the first lower polarizing units 11 have same number of corresponding color barriers, and the second upper polarizing units 22 and the second lower polarizing units 12 have same number of corresponding color barriers. For example, a first lower polarizing unit 11 may correspond to M number of color barriers, and a second lower polarizing unit 12 may correspond to N number of color barriers. M and N may be different positive integers, and M≥1, N≥1. The emitted light may still have two mutually orthogonal polarization directions, and may be similar to natural light.

Figure 8:
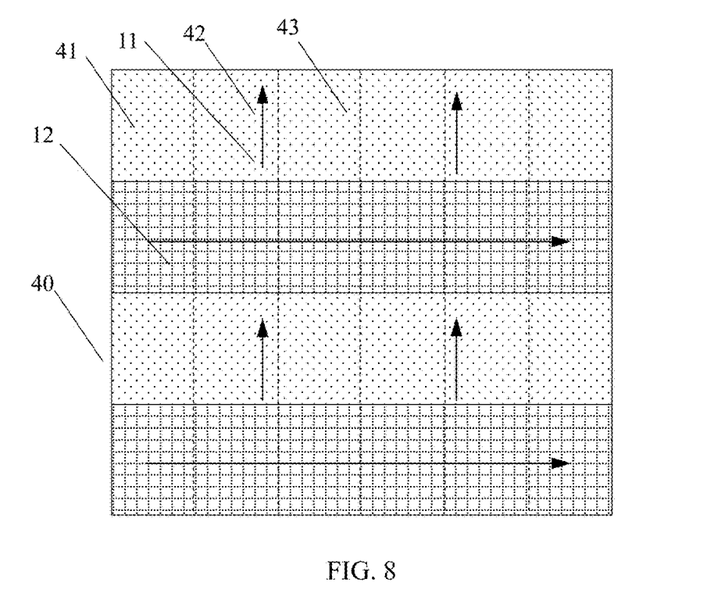
FIG. 8 illustrates a schematic view of another exemplary lower regionalized polarizer according to the disclosed embodiments.

FIG. 8 illustrates a schematic view of another exemplary lower regionalized polarizer according to the present disclosure. Referring to FIG. 8, a similar liquid crystal display panel may be provided. The color filter 40 disposed on the upper substrate 32 may include a plurality of color barriers corresponding to a plurality of sub-pixel units disposed on the lower substrate 31. The color filter 40 may include first color barriers 41, second color barriers 42, and third color barriers 43 for displaying different colors. The first color barriers 41, the second color barriers 42, and the third color barriers 43 may be arranged alternately and repeatedly in rows on the color filter 40. Color barriers displaying same color may be arranged in columns on the color filter 40. For example, each column of the color filter 40 may include only first color barriers 41 or only second color barriers 42.

The lower regionalized polarizer 10 shown in FIG. 8 may be different from other embodiments above because the lower regionalized polarizer 10 has each first lower polarizing unit 11 corresponding to one row of color barriers and each second lower polarizing unit 12 corresponding to another row of color barriers. Color barriers of different colors may be arranged alternately and repeatedly in a row on the color filter 40. For example, a first lower polarizing unit 11 may correspond to the first row of color barriers on the color filter 40, and a second lower polarizing unit may correspond to the second row of color barriers on the color filter 40. Similarly, two first lower polarizing units 11 or two second lower polarizing units 12 may not be arranged adjacently in the column direction on the color filter 40.

Figure 9:
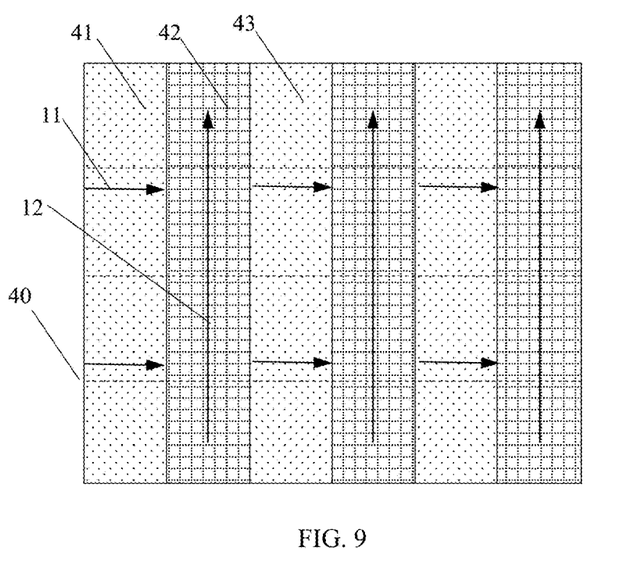
FIG. 9 illustrates a schematic view of another exemplary lower regionalized polarizer according to the disclosed embodiments.

FIG. 9 illustrates a schematic view of the structure of another exemplary lower regionalized polarizer according to the present disclosure. Referring to FIG. 9, a similar liquid crystal display panel may be provided. The color filter 40 disposed on the upper substrate 32 may include a plurality of color barriers corresponding to a plurality of sub-pixel units disposed on the lower substrate 31. The color filter 40 may include first color barriers 41, second color barriers 42, and third color barriers 43 for displaying different colors. The first color barriers 41, the second color barriers 42, and the third color barriers 43 may be arranged alternately and repeatedly in columns on the color filter 40. Color barriers displaying same color may be arranged in rows on the color filter 40. For example, each row on the color filter 40 may include only first color barriers 41 or only second color barriers 42.

The lower regionalized polarizer 10 shown in FIG. 9 may be different from other embodiments above because the lower regionalized polarizer 10 has each first lower polarizing unit 11 corresponding to one column of color barriers and each second lower polarizing unit 12 corresponding to another column of color barriers. Color barriers of different colors may be arranged alternately and repeatedly in a column on color filter 40. For example, a first lower polarizing unit 11 may correspond to the first column of color barriers on the color filter 40, and a second lower polarizing unit may correspond to the second column of color barriers on the color filter 40. Similarly, two first lower polarizing units 11 or two second lower polarizing units 12 may not be arranged adjacently in a row direction on the color filter 40.

In certain embodiments, each polarizing unit may correspond to a row of color barriers. The first lower polarizing units 11 and the second lower polarizing units 12 may correspond to equal number of rows. In certain other embodiment, each polarizing unit may correspond to a column of color barriers. The first lower polarizing units 11 and the second lower polarizing units 12 may correspond to equal number of columns.

In other embodiments, the first lower polarizing units 11 and the second lower polarizing units 12 may have different numbers of rows (or columns) of color barriers as long as the first upper polarizing units 21 and the first lower polarizing units 11 have same number of rows (or columns) of color barriers, and the second upper polarizing units 22 and the second lower polarizing units 12 have same number of rows (or columns) of color barriers. For example, first lower polarizing units 11 may correspond to M rows (columns) of color barriers, and second lower polarizing units 12 may correspond to N rows (columns) of color barriers. M and N may be different positive integers, and M≥1, N≥1. The emitted light may still have two mutually orthogonal polarization directions, and may be similar to natural light.

In the liquid crystal display panel, the lower regionalized polarizer 10 is not limited to being disposed coplanar with the lower planarization layer 314 on the lower substrate 31, and the upper regionalized polarizer 20 is not limited to being disposed coplanar with the upper planarization layer 322 on the upper substrate 32 as long as the lower regionalized polarizer 10 is on the lower side of the liquid crystal layer 30, and the upper regionalized polarizer 20 is on the upper side of the liquid crystal layer 30. In certain embodiments, the lower regionalized polarizer 10 and the upper regionalized polarizer 20 may be disposed independently on the lower substrate 31 and the upper substrate 32 respectively rather than being disposed coplanar with any layer of the liquid crystal display panel.

The present disclosure also provides a method of fabricating the liquid crystal display panel described above. The method of fabricating the liquid crystal display panel shown in FIG. 3 may be illustrated. The fabrication method may include a lower substrate fabrication process, an upper substrate fabrication process, and a liquid crystal dropping and bonding process.

The lower substrate 31 fabrication process may include the following steps.

Referring back to FIG. 3, a transparent base substrate 310 may be formed. The transparent base substrate 310 may be made of glass or other suitable transparent material. A disilane gas may be used as the source gas in a plasma chemical vapor deposition (CVD) process to form a polysilicon material film. Laser beams may be used to cure the polysilicon material film to form a polysilicon film. A photolithography patterning process may be applied to the polysilicon film to form an active layer 35. Optionally, the plasma CVD process may be used to form a silicon oxide or silicon nitride film between the transparent base substrate 310 and the active layer 35. The silicon oxide or silicon nitride film may serve as a substrate bottom film or buffer layer 311 to protect the active layer 35 from being affected by the impurity particles on the transparent base substrate 310.

Next, a plasma CVD process may be used to form a silicon oxide or silicon nitride film on the entire surface of the lower substrate already including the active layer 35. The silicon oxide or silicon nitride film may serve as a gate insulating layer 312. The active layer 35 may be doped with phosphorus or boron impurities through the gate insulating layer 312. Further, a sputtering process may be used to sequentially form a molybdenum film and an aluminum film on the entire surface of the gate insulating layer 312. And then, a photolithography patterning process may be used to form a gate electrode 38 and a gate line (not shown), etc. Next, the gate line may be used as a mask to heavily dope the active layer 35 with ions such as phosphorus or boron ions through the gate insulating layer 312 to form a channel region where the active layer 35 and the gate electrode 38 partially overlap, a source region in contact with the source electrode 36, and a drain region in contact with the drain electrode 37.

Next, a plasma CVD process may be used to sequentially form a silicon nitride film, a silicon oxide film, and another silicon nitride film on the gate insulating layer 312. The silicon nitride film, the silicon oxide film, and another silicon nitride film may be stacked together to form a first insulating layer 313. The portion of the gate insulating layer 312 and the first insulating layer 313 overlapping with the active layer 35 may be etched to form active contact holes 361 and 371.

Further, a sputtering process may be used to sequentially form a titanium film, an aluminum film and another titanium film on the entire surface of the first insulating layer 313 along with the active contact holes 361 and 371. Then a photolithography patterning process may be used to form a source electrode 36, a drain electrode 37, and data lines (not shown). Further, a coating and an optical alignment processes may be combined to form a lower planarization layer 314 and a lower regionalized polarizer 10 on the entire surface of the lower substrate 31 along with the source electrode 36, the drain electrode 37 and the data lines. The lower planarization layer 314 and the lower regionalized polarizer 10 may be coplanar with each other. Specifically, the process of forming the lower planarization layer 314 and the lower regionalized polarizer 10 may include the following steps.

Step one: spin coating an organic film forming material on the entire substrate formed with a source electrode 36, a drain electrode 37, and data lines.

Specifically, an acrylic resin solution including a mixture of acrylic resin, naphthoquinone diazide ester, 1,4-dioxane, coupling agent, diethylene glycol ethyl methyl ether, and propylene glycol methyl ether acetate may be provided. Then, an optical alignment prepolymer mixed with a dichroic organic dye may be mixed in certain proportions with the acrylic resin solution described above to produce an organic film forming material. Next, the organic film forming material may be spin coated over the source electrode 36, the drain electrode 37, the data lines, and the entire surface of the lower substrate 31. Alternatively, the dichroic organic dye may be mixed with the acrylic resin solution described above to produce the organic film forming material. In one embodiment, the optical alignment prepolymer may be made of photosensitive polyimide, and the dichroic organic dye may be, for example, an azo dye.

Step two: pre-curing the organic film forming material coated over the entire surface of the lower substrate to form a lower planarization layer 314.

In the process of spin coating and before the process of pre-curing, due to the fluidity characteristics, the acrylic resin solution described above may be able to fill the gaps and steps caused by the thickness differences when the gate insulating layer 312 and the first insulating layer 313 are formed through a CVD process. After the process of pre-curing, a flat surface lower planarization layer 314 may be obtained.

Figure 10A:
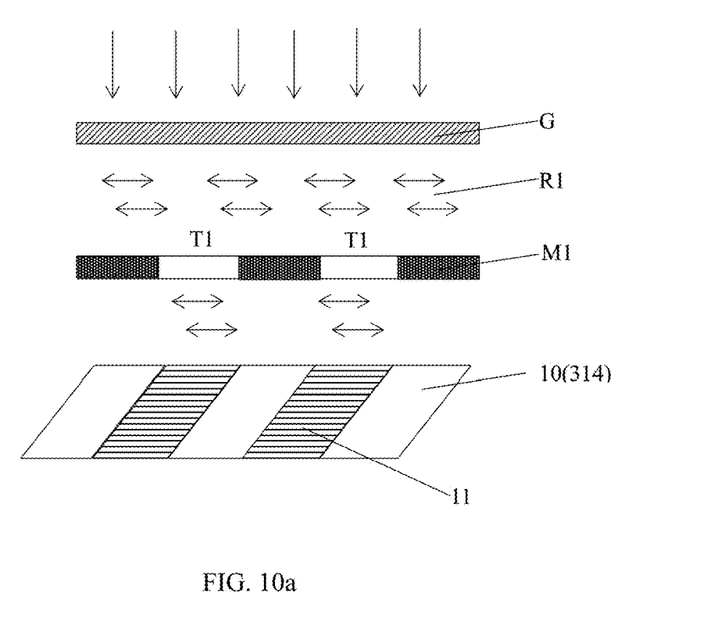
FIG. 10a illustrates a schematic view of an exemplary method of fabricating a lower regionalized polarizer according to the disclosed embodiments.

Step three: providing an ultra violet light source emitting an ultra violet light with a wavelength range, for example, approximately between 254 nm and 313 nm, and producing a first linearly polarized light R1 after the ultra violet light passes through a polarizer G, for example, a metallic wire-grid polarizer. Then, the first linearly polarized light R1 may pass through a first mask M1 and may irradiate the lower planarization layer 314.

The first mask M1 may have a light-transmitting portion T1 and the rest of the first mask M1 may be a light-shielding portion. The first linearly polarized light R1 may pass through the light-transmitting portion T1 of the first mask M1 to shine on the portion of the lower planarization layer 314 that overlaps with the light-transmitting portion T1. The dichroic organic dye in the portion of the lower planarization layer 314 exposed to the first linearly polarized light R1 may be aligned to a certain polarization direction. Thus, first lower polarizing units 11 may be formed.

Step four: adjusting the relative position between the polarizer G and the substrate formed with the first lower polarizing units 11 on the lower planarization player 314 by horizontally rotating the substrate by 90 degrees, or horizontally rotating the polarizer G by 90 degrees without changing the substrate position, and replacing the first mask M1 with a second mask M2 between the polarizer G and the lower planarization layer 314. The second mask M2 may have a light-transmitting portion T2 and the rest of the second mask M2 may be a light-shielding portion.

A second linearly polarized light R2 may pass through the light-transmitting portion T2 of the second mask M2 to shine on the portion of the lower planarization layer 314 that overlaps with the light-transmitting portion T2. The dichroic organic dye in the portion of the lower planarization layer 314 exposed to the second linearly polarized light R2 may be aligned to a different polarization direction. Thus, second lower polarizing units 12 may be formed. The first lower polarizing units 11 and the second lower polarizing units 12 may have mutually orthogonal polarization directions.

Step five: curing the lower planarization layer 314 formed with the above regionalized polarizing procedure by, for example, performing a second high temperature curing. The second curing may have a high temperature approximately at 230 degrees Celsius. The curing may enhance the anisotropy feature of the first lower polarizing units 11 and the second lower polarizing units 12. Thus, a lower regionalized polarizer 10 may be formed coplanar with the lower planarization layer 314.

Referring back to FIG. 3, a sputtering process may be used to form an indium tin oxide (ITO) film over the entire surface of the lower substrate after the through-hole 371 is formed in the planarization layer 314. Then, a photolithography patterning process may be used to form a first electrode 315. Next, a plasma CVD process may be used to sequentially form a silicon nitride film, a silicon oxide film and a silicon nitride film and to stack the three films to form a second insulating layer 316. Again, a sputtering process may be used to form an ITO film, and then a photolithography patterning process may be used to form a second electrode 317. The second electrode 317 may be electrically connected to the drain electrode 37 through the through-hole 371 that sequentially penetrates the second insulating layer 316, the first electrode 315, and the lower planarization layer 314. Thus, the second electrode 317 may become a pixel electrode.

Finally, for example, a printing process may be used to coat a polyimide resin layer on the entire surface of the lower substrate already formed with the second electrode 317, and the polyimide resin layer may be rubbed to form a lower alignment layer 318. Alternatively, for example, a printing process may be used to coat a photosensitive polyimide resin layer on the entire surface of the lower substrate already formed with the second electrode 317, and the photosensitive polyimide resin layer may be subject to an optical alignment process to form a lower alignment layer 318. At this point, the lower substrate 31 fabrication may be completed.

The upper substrate 32 fabrication process may include the following steps.

Referring back to FIG. 3, a transparent base substrate 320 may be formed. The transparent base substrate 320 may be made of glass or other suitable transparent material. A color filter 40 may be formed on the transparent base substrate 320. A coating and an optical alignment process may be combined to form an upper planarization layer 321 and an upper regionalized polarizer 20. The upper planarization layer 321 and the upper regionalized polarizer 20 may be coplanar with each other. Specifically, the process of forming the upper planarization layer 321 and the upper regionalized polarizer 20 may be similar to the process of forming the lower planarization layer 314 and the lower regionalized polarizer 10 and will not be repeated herein.

The upper regionalized polarizer 20 may include first upper polarizing units 21 and second upper polarizing units 22. The first upper polarizing units 21 and the second upper polarizing units 22 may have mutually orthogonal polarization directions. At the same time, the first upper polarizing units 21 and the second upper polarizing units 22 of the upper regionalized polarizer 20 may correspond to the first lower polarizing units 11 and the second lower polarizing units 12 of the lower regionalized polarizer 10. The first upper polarizing units 21 and the first lower polarizing units 11 may have mutually orthogonal polarization directions, and the second upper polarizing units 22 and the second lower polarizing units 12 may have mutually orthogonal polarization directions.

Finally, for example, a printing process may be used to coat a polyimide resin layer on the entire surface of the upper substrate already formed with the upper planarization layer 321 (and the upper regionalized polarizer 20), and the polyimide resin layer may be rubbed to form an upper alignment layer 322. Alternatively, for example, a printing process may be used to coat a photosensitive polyimide resin layer on the entire surface of the upper substrate already formed with the upper planarization layer 321 (and the upper regionalized polarizer 20), and the photosensitive polyimide resin layer may be subject to an optical alignment process to form an upper alignment layer 322. At this point, the upper substrate 32 fabrication may be completed.

The procedure for dropping liquid crystals and for bonding the lower substrate 31 and the upper substrate 32 may include the following steps.

First, for example, a dispenser may be used to form a frame made of a sealing material such as a UV light cured resin or a thermally cured resin on the upper substrate 32. Then, liquid crystals may be dropped onto the upper substrate 32 inside the sealing material frame.

Further, under a reduced air pressure, the upper substrate 32 with the liquid crystal drops may be bonded with the previously fabricated lower substrate 31. The liquid crystals may be sealed between the bonded substrates. When returned to the normal atmospheric pressure, the bonded substrates may be pressed together. Next, the sealing material sandwiched between the bonded substrates may be cured by an ultra violet light, and may be further cured by a high temperature. At this point, the fabrication of the liquid crystal display panel shown in FIG. 3 may be completed.

In addition, the present disclosure provides another method of fabricating the liquid crystal display panel. In one embodiment, the lower regionalized polarizer 10 and the upper regionalized polarizer 20 may be formed as independent films, and may not be coplanar with any other layers on the lower or upper substrate. Similarly, the method may include a process of fabricating the lower substrate, a process of fabricating the upper substrate, and a process of liquid crystal dropping and substrate bonding. Further, the method according to the present disclosure may include a process of fabricating the lower regionalized polarizer 10 and the upper regionalized polarizer 20. The process of fabricating the lower regionalized polarizer 10 may include the following steps.

Step one: spin coating an organic film forming material containing a dichroic organic dye on the entire substrate.

Specifically, in one embodiment, the organic film forming material may be, for example, a photosensitive polyimide, and the dichroic organic dye may be, for example, an azo dye.

Figure 10B:
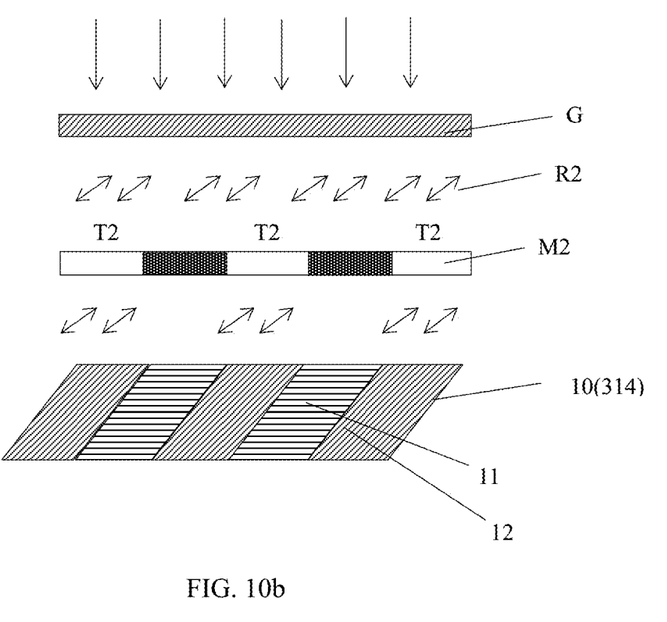
FIG. 10b illustrates a schematic view of another exemplary method of fabricating a lower regionalized polarizer according to the disclosed embodiments.

Step two: providing an ultra violet light source emitting an ultra violet light with a wavelength range, for example, approximately between 254 nm and 313 nm, and producing a first linearly polarized light R1 after the ultra violet light passes through a polarizer G, for example, a metal-grating polarizer. Then, the first linearly polarized light R1 may pass through a first mask M1 and may irradiate the organic film forming material. The first mask M1 may have a light-transmitting portion T1 and the rest of the first mask M1 may be a light-shielding portion. The first linearly polarized light R1 may pass through the light-transmitting portion T1 of the first mask M1 to shine on the portion of the organic film forming material that overlaps with the light-transmitting portion T1. The dichroic organic dye in the portion of the organic film forming material exposed to the first linearly polarized light R1 may be aligned to a certain polarization direction. Thus, first lower polarizing units 11 may be formed.

Step three: adjusting the relative position between the polarizer G and the substrate formed with the first lower polarizing units 11 on the organic film forming material by horizontally rotating the substrate by 90 degrees, or horizontally rotating the polarizer G by 90 degrees without changing the substrate position, and replacing the first mask M1 with a second mask M2 between the polarizer G and the organic film forming material. The second mask M2 may have a light-transmitting portion T2 and the rest of the second mask M2 may be a light-shielding portion. A second linearly polarized light R2 may pass through the light-transmitting portion T2 of the second mask M2 to shine on the portion of the organic film forming material that overlaps with the light-transmitting portion T2. The dichroic organic dye in the portion of the organic film forming material exposed to the second linearly polarized light R2 may be aligned to a different polarization direction. Thus, second lower polarizing units 12 may be formed. The first lower polarizing units 11 and the second lower polarizing units 12 may have mutually orthogonal polarization directions.

Step four: curing the organic film forming material already formed with the above regionalized polarizing procedure with a high temperature. For example, the thermal curing may have a high temperature approximately at 230 degrees. The curing may enhance the anisotropy feature of the first lower polarizing units 11 and the second lower polarizing units 12. Thus, a lower regionalized polarizer 10 may be formed.

The process of fabricating the upper regionalized polarizer 20 may be similar to the process of fabricating the lower regionalized polarizer 10 described above and will not be repeated herein.

The present disclosure provides a liquid crystal display panel including an upper regionalized polarizer and a lower regionalized polarizer and a method of fabricating the liquid crystal display panel. The upper regionalized polarizer may include first upper polarizing units and second upper polarizing units. The first upper polarizing units and the second upper polarizing units may have mutually orthogonal polarization directions.

The lower regionalized polarizer may include first lower polarizing units and second lower polarizing units. The first lower polarizing units may correspond to the first upper polarizing units, and the second lower polarizing units may correspond to the second upper polarizing units. The first lower polarizing units and the first upper polarizing units may have mutually orthogonal polarization directions. The second lower polarizing units and the second upper polarizing units may have mutually orthogonal polarization directions.

The liquid crystal molecules of the liquid crystal display panel may have paralleled initial alignment directions at the interfaces of the two glass substrates. One of the polarization directions of the first upper polarizing units and the second upper polarizing units may be parallel with the initial alignment direction of the liquid crystal molecules. The other polarization direction may be mutually orthogonal to the initial alignment direction of the liquid crystal molecules. The light emitted from the liquid crystal display panel may be guaranteed to have two mutually orthogonal polarization directions. So the light emitted from the liquid crystal display panel may be similar to natural light. Thus, the viewer wearing polarized glasses may observe a desirable display effect.

The specification above provides detailed descriptions of the liquid crystal display panel and the fabrication method according to the present disclosure. Various embodiments have been described to illustrate the operation principles and exemplary implementations. The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A liquid crystal display panel, comprising:
an upper substrate;
a lower substrate as an array substrate, configured facing toward the upper substrate;
a liquid crystal layer sandwiched between the upper substrate and the lower substrate;
an upper regionalized polarizer disposed on the upper substrate including a plurality of first upper polarizing units and second upper polarizing units;
a lower regionalized polarizer disposed on the lower substrate including a plurality of first lower polarizing units and a plurality of second lower polarizing units, wherein:
the first lower polarizing units correspond to the first upper polarizing units;
the second lower polarizing units correspond to the second upper polarizing units;
the first upper polarizing units and the second upper polarizing units have mutually orthogonal polarization directions;
the first lower polarizing units and the first upper polarizing units have mutually orthogonal polarization directions; and
the second lower polarizing units and the second upper polarizing units have mutually orthogonal polarization directions;
a lower planarization layer formed on one side of the lower substrate facing toward the upper substrate, wherein the lower regionalized polarizer is configured coplanar with the lower planarization layer;
a plurality of source electrodes, drain electrodes, and data lines disposed on the lower substrate, wherein:
the source electrodes, the drain electrodes, and the data lines are coplanar with each other;
the source electrodes and the data lines are electrically connected; and
the source electrodes, the drain electrodes, and the data lines are covered by the lower planarization layer;
a plurality of first electrodes disposed on the lower planarization layer; and
a plurality of second electrodes disposed on a second insulating layer separating the first electrodes, configured to form an electric field parallel with a surface of the lower substrate.

2. The liquid crystal display panel of claim 1, further including:
a color filter, including a plurality of color barriers, wherein each first upper polarizing unit and each second upper polarizing unit correspond to at least one color barrier respectively.

3. The liquid crystal display panel of claim 2, wherein:
the plurality of color barriers are arranged in arrays; and
each first upper polarizing unit and each second upper polarizing unit correspond to at least one column of color barriers respectively.

4. The liquid crystal display panel of claim 2, wherein:
the plurality of color barriers are arranged in arrays; and
each first upper polarizing unit and each second upper polarizing unit correspond to at least one row of color barriers respectively.

5. The liquid crystal display panel of claim 2, wherein:
each first upper polarizing unit and each second upper polarizing unit simultaneously correspond to M number of color barriers respectively;
M is a positive integer; and
M≥1.

6. The liquid crystal display panel of claim 5, wherein:
the color filter includes a plurality of color barrier units;
each color barrier unit includes a red color barrier, a green color barrier, and a blue color barrier; and
each first upper polarizing unit corresponds to one of the red, green and blue color barriers, and
each second upper polarizing unit corresponds to one of the red, green and blue color barriers.

7. The liquid crystal display panel of claim 2, wherein:
the first upper polarizing units correspond to M number of color barriers;
the second upper polarizing units correspond to N number of color barriers;
M and N are not equal;
M and N are positive integers; and
M≥1, N≥1.

8. The liquid crystal display panel of claim 1, wherein:
the upper substrate is a color filter substrate;
a color filter is configured on one side of the upper substrate facing toward the lower substrate;
an upper planarization layer is formed on the color filter; and
the upper regionalized polarizer is configured coplanar with the upper planarization layer.

9. The liquid crystal display panel of claim 1, further including:
a lower alignment layer disposed on a side of the lower substrate facing toward the upper substrate; and
an upper alignment layer disposed on a side of the upper substrate facing toward the lower substrate,
wherein the lower alignment layer and the upper alignment layer have a same alignment direction.

10. The liquid crystal display panel according to claim 1, wherein:
the lower substrate includes a plurality of source electrodes covered by the plurality of first lower polarizing units, and a plurality of drain electrodes covered by the plurality of second lower polarizing units.

* * * * *